United States Patent [19]

Rauner et al.

[11] Patent Number: 5,448,480
[45] Date of Patent: Sep. 5, 1995

[54] FAIL-SAFE OPERATION VIA CONTROLLER REDUNDANCY FOR STEERING THE BACK WHEELS OF A ROAD VEHICLE

[75] Inventors: Hans Rauner, Nittenau; Gerhard Gerl, Regensburg; Edmund Donges, Fuerstenfeldbruck; Reinhard Auffhammer, Munich; Thomas Seidenfuss, Massenhausen, all of Germany

[73] Assignees: Siemens Aktiengesellschaft; Bayerische Motoren Werke AG, both of Munich, Germany

[21] Appl. No.: 971,667

[22] Filed: Nov. 4, 1992

Related U.S. Application Data

[63] Continuation-in-part of Ser. No. 601,754, Oct. 30, 1990, abandoned.

[30] Foreign Application Priority Data

May 11, 1988 [DE] Germany ................... 38 16 254.7

[51] Int. Cl.$^6$ ............................................. B62D 5/30
[52] U.S. Cl. ........................ 364/424.05; 180/79.1; 180/142
[58] Field of Search ............... 364/424.05; 180/79.1, 180/140, 141, 142

[56] References Cited

U.S. PATENT DOCUMENTS

| | | | |
|---|---|---|---|
| 4,115,847 | 9/1978 | Osder et al. | 364/186 X |
| 4,181,945 | 1/1980 | Adler et al. | 371/68.3 X |
| 4,198,678 | 4/1980 | Maatje et al. | 371/68.3 X |
| 4,621,327 | 11/1986 | Dolph et al. | 364/424.05 |
| 4,687,214 | 8/1987 | Uno | 280/91 |
| 4,715,463 | 12/1987 | Shimizu | 180/142 |
| 4,718,514 | 1/1988 | Hirakushi | 180/141 |
| 4,745,542 | 5/1988 | Baba et al. | 364/184 |
| 4,749,238 | 6/1988 | Singleton et al. | 303/15 |
| 4,770,264 | 9/1988 | Wright et al. | 180/140 |
| 4,782,907 | 11/1988 | Morishita et al. | 180/140 |
| 4,799,159 | 1/1989 | Davidson et al. | 364/424.06 |
| 4,835,693 | 5/1989 | Smith et al. | 364/426.01 |
| 4,869,334 | 9/1989 | Marumoto et al. | 364/424.05 X |
| 4,881,604 | 11/1989 | Orthwein | 173/11 |
| 4,913,249 | 4/1990 | Lang | 364/424.05 X |
| 4,945,486 | 7/1991 | Nitschke et al. | 364/424.05 X |
| 4,953,652 | 9/1990 | Ohmura et al. | 180/140 |

FOREIGN PATENT DOCUMENTS

| | | |
|---|---|---|
| 0207611 | 1/1987 | European Pat. Off. |
| 0243180 | 10/1987 | European Pat. Off. |
| 2332243 | 7/1974 | Germany . |
| 2128947 | 5/1984 | United Kingdom . |
| WO85/04631 | 10/1985 | WIPO . |
| WO87/03044 | 5/1987 | WIPO . |
| WO89/11992 | 12/1989 | WIPO . |

OTHER PUBLICATIONS

Kraft, et al., *Microprogrammed Control and Reliable Design of Small Computers*, N.J., Prentice Hall, pp. 176, 182, 198 ISBN, 0-13-581140-6, 1981.

*Primary Examiner*—Vincent N. Trans
*Attorney, Agent, or Firm*—Hill, Steadman & Simpson

[57] ABSTRACT

An electronic control unit for steering the back wheels of a road vehicle. The unit has a steering device that controls the steering angle of the back wheels in response to an emergency steering signal, has sensors for at least steering angle, traveling speed and degree of steering wheel lock, and has a calculating unit having two computers. Control signals derived from sensor signals are supplied to each of the computers. Each of the computers independently evaluates the control signals and independently outputs an emergency steering signal to the steering device in an emergency.

20 Claims, 3 Drawing Sheets

FAIL-SAFE OPERATION VIA CONTROLLER REDUNDANCY FOR STEERING THE BACK WHEELS OF A ROAD VEHICLE

This is a continuation-in-part of application Ser. No. 601,754, filed Oct. 30, 1990, now abandoned.

BACKGROUND OF THE INVENTION

The present invention relates to an electronic control unit for steering the back wheels of a road vehicle. The electronic control unit is of the type having the following elements: a steering means that, in turn controlled by an emergency steering signal in an emergency, controls the steering angle of the back wheels in emergency-suited fashion in accord with a selected emergency operation concept, i.e., for example, controls the steering angle to zero in delayed fashion or, for example, rigidly maintains the most recently established steering angle; sensors that at least respectively acquire the steering angle, the traveling speed and the degree of steering wheel lock or quantities respectively dependent thereon; and a calculating unit that contains a computer means to which the sensor signals and/or signals derived therefrom are supplied as control signals that outputs the emergency steering signal to the steering means in an emergency dependent on a program-controlled evaluation of the control signals that recognizes emergencies, also see EP-A2-0 243 180 and U.S. Pat. No. 4,687,314. What is thus involved is a control unit also governs emergencies—for example slipping wheels, a road vehicle that has spun out and/or defects in safety-relevant electronic components such as, for example, sensors—more or less well, in that the steering of the back wheels is not controlled as in normal operation but based on a special emergency operation concept. A number of different emergency operation concepts of this type are intrinsically known. The invention was initially in fact developed for an emergency operation concept wherein the steering angle is rigidly retained in an emergency by blocking the steering of the back wheels. It turns out, however, that the invention can also be applied to other emergency operation concepts over and above this.

SUMMARY OF THE INVENTION

The object of the invention,
to offer a new safety concept that can be used in an emergency for further improving the control of the road vehicle in addition to arbitrary emergency operation concepts,
namely to particularly increase the error tolerance of the control unit, particularly in that the failure of the computer unit to output an emergency steering signal by mistake because of a malfunctioning computer even though an emergency is present is prevented—an especially dangerous situation that can lead to serious accidents of the road vehicle, and
to nonetheless make the computer unit capable of immediately outputting its emergency steering signal insofar as possible in case of emergency,
is achieved by the following. The computer means is redundant in the calculating unit and has at least two computers; the control signals are supplied to each of the two computers; both computers evaluate the control signals on their own; and each computer immediately outputs an emergency steering signal to the steering means in an emergency on its own, independently of the other computer measures recited in patent claim 1.

In the invention, thus, the computers in the computing unit are redundant in a special way and, deviating from the most commonly employed type of operation, are operated by redundant computers. Redundant computers, namely, are usually monitored with a comparator unit that compares the computation results of the two computers—for example microsynchronously—, whereby the faultlessly calculating computer is identified with the potential assistance of special calculating methods, for example with the assistance of EDC methods or with other self-testing methods, and only the results thereof are evaluated. This test or comparator unit, however, can itself likewise malfunction—for example even despite EDC methods given a number of multiple error combinations when a plurality of errors simultaneously occur—or can be actually defective when it identifies an inequality of the computer results—it can even be defective when it identifies an equality of these results!—and can thus itself diminish the reliability of the control unit, particularly when it prevents the output of the emergency steering signal even though an emergency is objectively present and was even definitely recognized by the computer unit up to a certain extent.

In the invention, thus, the time delay that is caused by the comparison is avoided; above all, however, the unreliability that is caused by an error within the comparator unit is also avoided. What the invention likewise avoided is that the comparator unit must also be tested in and of itself—at least frequently over and over—in an involved way given computer results that appear to deviate from one another and, in addition, given computer results that do not appear to deviate from one another, whereby this test itself not only requires time but can in itself be a source of error and, thus, produce an unnecessary reduction in reliability.

The invention, thus, also avoids such operational uncertainties and delays in the operation of the redundant computers caused by comparator devices in that each computer in and of itself already immediately outputs an emergency steering signal and, thus, outputs immediately to the steering means even when the other computer has not yet output an emergency steering signal. As long as the computers work faultlessly, the invention faultlessly controls the steering of the back wheels in an emergency according to the emergency operation concept that is respectively selected. When, by contrast, one of the two computers—for whatever reason, for example only due to a transient error in its program memory—calculates a faulty result, then it would potentially output what would be at most a highly unnecessary emergency steering signal due to this result, in case, namely, the calculated result simulates an emergency. Such a faulty control of the steering of the back wheels, however, can be accepted; given a malfunction of one of the computers, namely, there is reasonable probability that the invention will never control its steering means in a highly dangerous way as though there were a normal operating case even though there is an emergency.

The measures recited below allow the reliability of the control unit to be further enhanced, namely to respectively achieve corresponding, further advantages. Among other things, namely, the measures:
allow situations that are dangerous to the road vehicle to be avoided in that a switch into the emergency operation corresponding to the selected emergency operation concept is undertaken given significant malfunctions or faulty conditions of the appertaining component parts;

prevent an emergency steering signal from not triggering an emergency-suited control of the steering of the back wheels given malfunction of an emergency element;

allow the redundant emergency elements to be reliably and redundantly controlled even given outage of one of the computer and/or even given malfunction—for example, rupture—of one of the emergency signal lines;

make it possible for the computers to mutually monitor or, respectively, test one another;

allow a mutual monitoring or, respectively, testing of the computers to be achieved without precise chronological matching or, respectively, synchronization between the computers, for example in that one computer is allowed to work off a test program in the other computer with chronological delay, namely adapted to the respective beginning of the calculating pauses of the other computer;

allow a reliable, ex post facto diagnosis of the cause of the output of the emergency signal to be achieved even when one or both computers "have gotten completely stuck", i.e. had difficulties in the evaluation of the supplied controlled signals that could no longer be compensated;

make it possible to achieve that the computers only allow a normal operation, even after starting, as soon as the control unit can exclude an emergency that may be initially present with adequate reliability;

make it possible, during starting, that the emergency elements are respectively controlled in an extremely surprising way by only one of the computers such the transition into the normal operation only ensues when both computers—by evaluating the control signals supplied to them—have diagnosed clearly enough that the emergency elements respectively allocated to them are faultlessly working;

allow an especially clear analysis during starting to be admitted even though one of the computers—or one of the emergency elements—may not be working completely faultlessly;

allow the computers to also be used for controlling the back wheel steering in normal operation;

allow a high operational reliability to be achieved for the road vehicle even during starting when some of the sensor signals do not yet supply usable values and a reliable evaluation by the computers is still hardly possible;

allow—in a very uncomplicated way—a subsequent determination after every calculation to be made with respect to the extent to which the results deviate from one another by comparing the calculating results of both computers and, as needed, to immediately start an error diagnosis program that clears up the cause for greater deviations of the calculating results;

make it possible that the one computer can already output its emergency steering signal while the other has not yet concluded its current evaluation; the evaluation, i.e. the calculation of the calculating results, namely, is frequently so involved—for example, because of complicated differential equations to be solved by iterative methods—that 10 msec and even more time frequently passes between the input of the sensor signals or, respectively, control signals into the computer on the one hand and the presence of the calculating result on the other hand;

allow program errors, i.e. software errors, on the basis whereof an emergency was erroneously not perceived to be neutralized, in that there is a high probability that at least the other computer will output its emergency steering signal in time in case of emergency;

allow hardware faults in one of the two computers as a result whereof an emergency is erroneously not perceived to be neutralized in that there is high probability that at least the other computer will output its emergency steering signal in time in case of emergency;

make it possible for both computers to very flexibly adapt to the respective time requirement for evaluating the control signals;

make it possible for faultily or imprecisely measuring sensors to be recognized and left out of consideration and/or for mean values to be formed from the sensor signals output by the two sensors that belong together or, respectively, for mean values to be formed from signals to be derived therefrom and to be supplied to the computer or, respectively, the computers as control signals and/or for only that sensor of the redundant sensors that provides the greatest indication that an emergency could be present to be taken into consideration;

allow the computers to be relieved, as a result whereof the computers end their evaluation cycle more quickly and can thus produce calculating results in a faster rhythm, i.e. can output the emergency steering signal faster in case of emergency;

allow a relieving of the computers with especially little hardware outlay for the editing units so that a shortening of the evaluation cycles within the computers and shorter calculating cycles for identifying the calculating results can be achieved, so that the computers can output their emergency steering signal more quickly in case of emergency with especially little, additional hardware outlay; and with especially low outlay and based on the worst case principle, allow that sensor of the redundant sensors that are inherently de facto equivalent to one another that identifies the most critical condition that most signals an emergency to have the greater influence on the output of the emergency steering signals, so that a failure of one of the redundant sensors caused, for example, by aging, only results therein that the condition monitored by this sensor continues to control the back wheel steering in emergency in a way suited to the emergency because of the redundant, other sensor.

These measures are implemented by the following configurations.

For self-testing the control unit, the computers are also supplied with test signals and/or status signals from components parts of the control unit; and the appertaining computer outputs an emergency steering signal when, in the self-test, it recognized malfunctions of its own component parts.

The steering means comprises at least two emergency elements in redundant fashion each of which is autonomously capable of controlling the steering angle in emergency-suited fashion in an emergency corresponding to the emergency operation concept.

Each computer, at any rate in the normal case, respectively outputs its emergency steering signal to both emergency elements via emergency steering signal lines individually allocated to the individual computers.

The two computers exchange information for subsequent emergency diagnosis and/or for mutual testing while starting and/or during ongoing operation of the road vehicle.

The information can be stored in a dual port RAM such that each computer has a memory area therein in which it can write and read and in which, however, the other computer can only respectively read, independently of whether a special memory area can potentially be additionally read and written by both computers.

After the output of an emergency steering signal and/or after the recognition of a status signal of a component part of the control unit corresponding to an error, both computers are arrested, are initialized for error diagnosis and both are ultimately re-started.

The emergency element is initially operated as in an emergency when starting the motor vehicle.

In the starting phase of the road vehicle, each computer has a different emergency element of the two emergency elements individually allocated to it until a check of the emergency elements has shown they are free of faults.

The steering means does not proceed into normal operation until the control signals and/or information exchanged by the computers show that no emergency is present.

Both emergency elements can be constructed such that, following the start of the road vehicle, they proceed into the normal operating condition only after activation on the basis of a special activation process.

At least one of the two computers generates steering signals during normal operation that it outputs to the steering means for normal steering angle control.

The two computers evaluate synchronously or the two computers evaluate synchronously but are chronologically shifted by approximately half an evaluation period. One computer can contain a different evaluation program than the other computer or one computer can have a different hardware structure than the other computer. Alternatively, the two computers evaluate asynchronously.

At least one of the sensors allocated to the computers or, respectively, at least one of the control signals supplied to the computers, with reference to the totality of control signals, can be inherently redundant.

Hardware as an editing unit that generates control signals derived from the sensor signals can be respectively inserted between at least a part of the sensors and the inputs of at least one of the computers, being inserted therebetween such that the appertaining control signals are respectively supplied only to the one of the two computers that individually follows the editing unit.

Alternatively, hardware as an editing unit that generates control signals derived from the sensor signals can be respectively inserted between at least one part of the sensors and the inputs of the computers, being inserted therebetween such that the appertaining control signals are respectively supplied to both computers.

One of two redundant sensors that belong together can be connected to an editing unit and the other of these sensors can be connected to the other editing unit.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

The invention shall be set forth in greater detail with reference to the schematic diagrams of exemplary embodiments shown in the figures and each having respectively two computers P1, P2.

Figure 1:
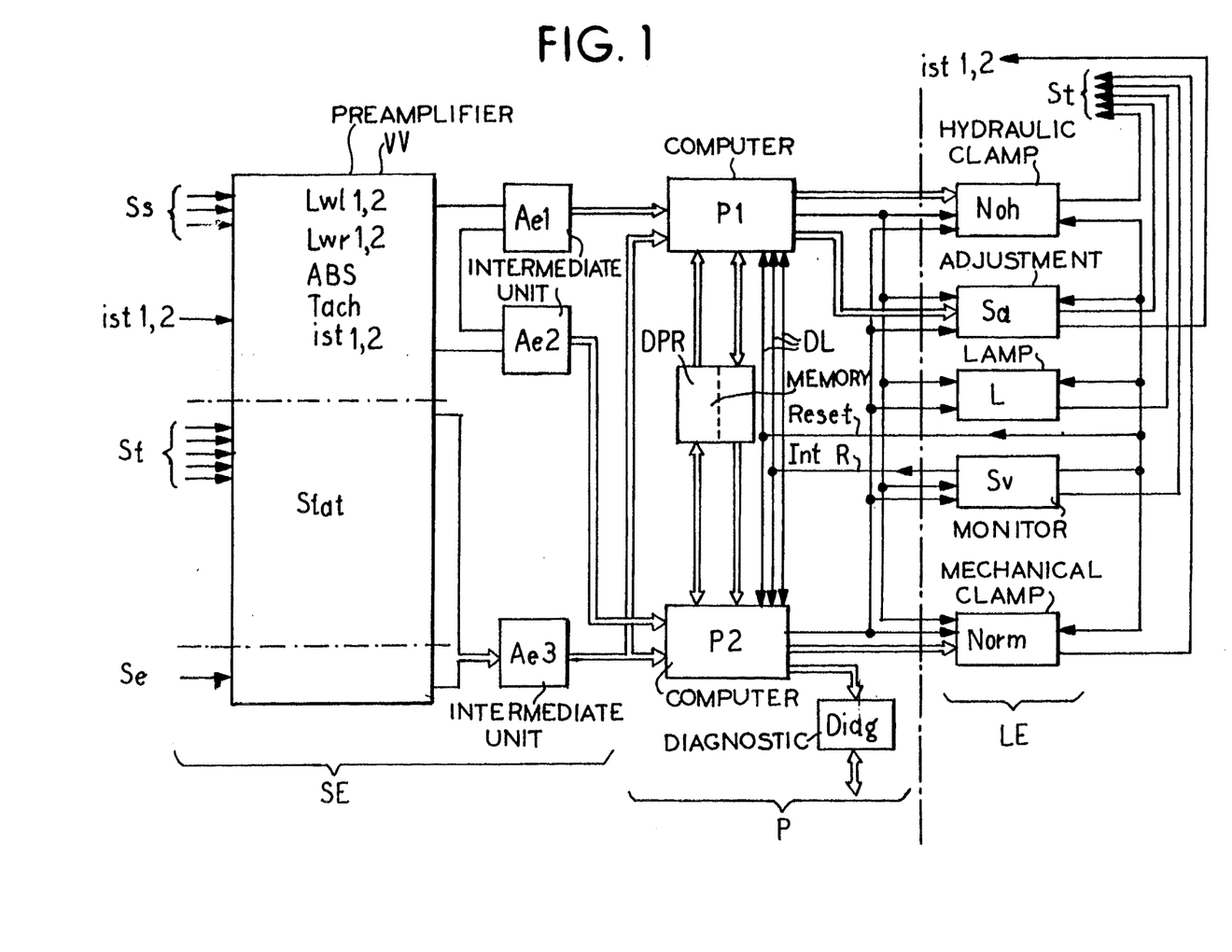
FIG. 1 is a block diagram of an embodiment of the present invention.

In the examples shown in FIG. 1, the steering means LE, by way of example contains an hydraulic clamp means Noh which blocks the steering of the back wheels such in an emergency that the steering angle present up to that point continues to be rigidly maintained in that any and all change in steering angle is hydraulically prevented by appropriate braking or, respectively, clamping mechanisms.

The steering means LE also contains an adjustment unit Sa that sets the steering angle of the back wheels during normal operation. In this example, thus, the computers P1, P2 also control the steering wheel angle of the back wheels in normal operation, namely with the adjustment unit Sa. In this example, thus, the computers are also involved in the steering angle control of the back wheels not only in emergencies but also during normal operation.

The steering means LE further contains one or more lamps L that inform the driver of the normal operation and of malfunction and, for example, that can also display the momentary value of the steering angle.

Over and above this, the steering means LE in the illustrated example additionally contains a monitoring unit Sv which monitors the occurrence of errors in the steering means LE—potentially in other parts of the control unit as well and/or in other parts of the road vehicle as well—for example on the basis of its own sensors and/or triggered by an emergency steering signal. This monitoring unit Sv can react as necessary, for example can trigger a reset that interrupts the evaluation by the computers and initializes the computers for a re-start of their evaluation or supplies a corresponding monitoring signal—preferably to the computers P1, P2—in some other way.

In addition, the steering means LE redundantly contains a mechanical clamping mechanism Nom that, in an emergency, rigidly retains the steering angle of the back wheels established up to that point in a purely mechanical way. For safety reasons, thus, the steering means LE contains two emergency elements formed by Noh/Nom that—each independently of the other—control the steering angle emergency-suited in emergencies in accord with the selected emergency operation concept—i.e., by clamping the steering in the present case.

Other types of emergency elements can also be inventively engaged instead of such clamp mechanisms, these, for example, setting the steering angle to zero in more or less delayed fashion in case of emergency.

The individual elements of the steering means LE comprise separate signal outputs St for their monitoring which, thus, supply test signals or, respectively, status signals and which are connected to signal inputs St of a pre-amplifier stage VV of the computers P1, P2 in the illustrated example.

Sensors or, respectively, the analog-to-digital converters allocated to such sensors are additionally attached in the pre-amplifier stage VV, for example electronic units that can correspond to the condition of a steering wheel angle sensor Lv1, of an automatic braking system ABS, of the speed Tach, of the status outputs Ist 1, 2 of the adjustment unit Sa that are redundant for safety reasons, the steering angle sensors Lwr1, 2 of the wheels that are redundant for safety reasons, other status monitors Stat and other, arbitrary inputs Se—for example, for outside temperature, the tire temperature and/or the light reflection of the more or less reflective roadway.

What are thus included in this pre-amplifier unit VV are thus not necessarily only the sensors themselves but, often, electronic component parts thereof as well which more or less recalculate or, respectively, reshape the sensor signals, see Ss, supplied by the sensors and deliver control signals at their output that are supplied to the two computers P1, P2 either directly or via intermediate units—see Ae1 through Ae3.

In the invention, thus, at least two computers P1, P2 are present to which the control signals are supplied for evaluation—i.e. for calculating a calculating result that can in turn respectively generate control signals for the steering means LE. Both computers P1, P2 thus process the control signals digitally supplied to them in the illustrated example in accord with programs that they store. These programs often contain instructions that correspond to complicated differential equations and appertaining, sometimes rather tiresome iterative methods. The control signals Ss, Lw1, Lwr1/2, ABS, Tach, Ist1/2, St, Se are thus processed into calculating results on the basis of these programs with sometimes little but frequently relatively great time expenditure, whereby the calculating results, despite a high calculating clock frequency in the MHz range, are frequently not present until after 10 msec or 40 msec. Based on its own calculating results, each computer P1, P2 independently decides whether an emergency is present or not. When an emergency is present, the appertaining computer—without first comparing its calculating result to the calculating result of the other computer—immediately delivers its emergency steering signal—potentially amplified via intermediate amplifiers Zv, see FIG. 2—to the steering means LE, immediately both to the hydraulic clamping means Noh as well as to the mechanical clamping mechanism Nom in the case illustrated in FIG. 1.

Both computers P1, P2 simultaneously individually output their emergency steering signal directly to the appertaining elements Noh/Nom of the steering means LE only when both computers P1, P2 simultaneously determine that an emergency has just arisen. There is at least a certain chronological offset between the output of their individual emergency steering signals when the one computer recognizes the occurrence of the emergency first and the other computer recognizes the occurrence of the emergency with a certain delay—or never. The emergency elements Noh/Nom, however, are then already activated by the first emergency steering signal because, in order to avoid time delays, one need not first wait in the invention—for example with the assistance of a comparator unit following the two computers P1, P2—until both computers P1, P2 have signaled the occurrence of the emergency.

What is thus prevented in the invention is that a malfunctioning computer of the calculating unit mistakenly does not output an emergency steering signal even though an emergency is present, this because the other of the two computers in the invention recognizes the emergency and in turn immediately outputs its emergency steering signal directly to the emergency elements Noh/Nom and without delay and triggers the control of the steering angles of the back wheels according to the emergency operation concept selected. The invention is thereby not tied to a specific emergency operation concept: for example that the steering angle of the back wheels that was previously established is rigidly retained in an emergency, as was hitherto preferably prescribed. The emergency elements Noh/Nom can also be replaced by other types of emergency elements that, for example, trigger the more or less delayed setting of the steering angle of zero of the back wheels in case of emergency.

The invention thus involves a new safety concept that can be employed in addition to arbitrary emergency operation concepts and serves the purpose of a further improvement of the control of the road vehicle in emergencies. The error tolerance of the control unit is enhanced by the invention particularly in that a faultily working computer that mistakenly does not output an emergency steering signal even though an emergency is present is contravened—an especially dangerous situation that could lead to extremely serious accidents of the road vehicle.

Despite this, the invention allows the emergency steering signal to be output especially quickly in case of emergency and to immediately initiate the measures according to the selected, arbitrary emergency operation concept.

Figure 2:
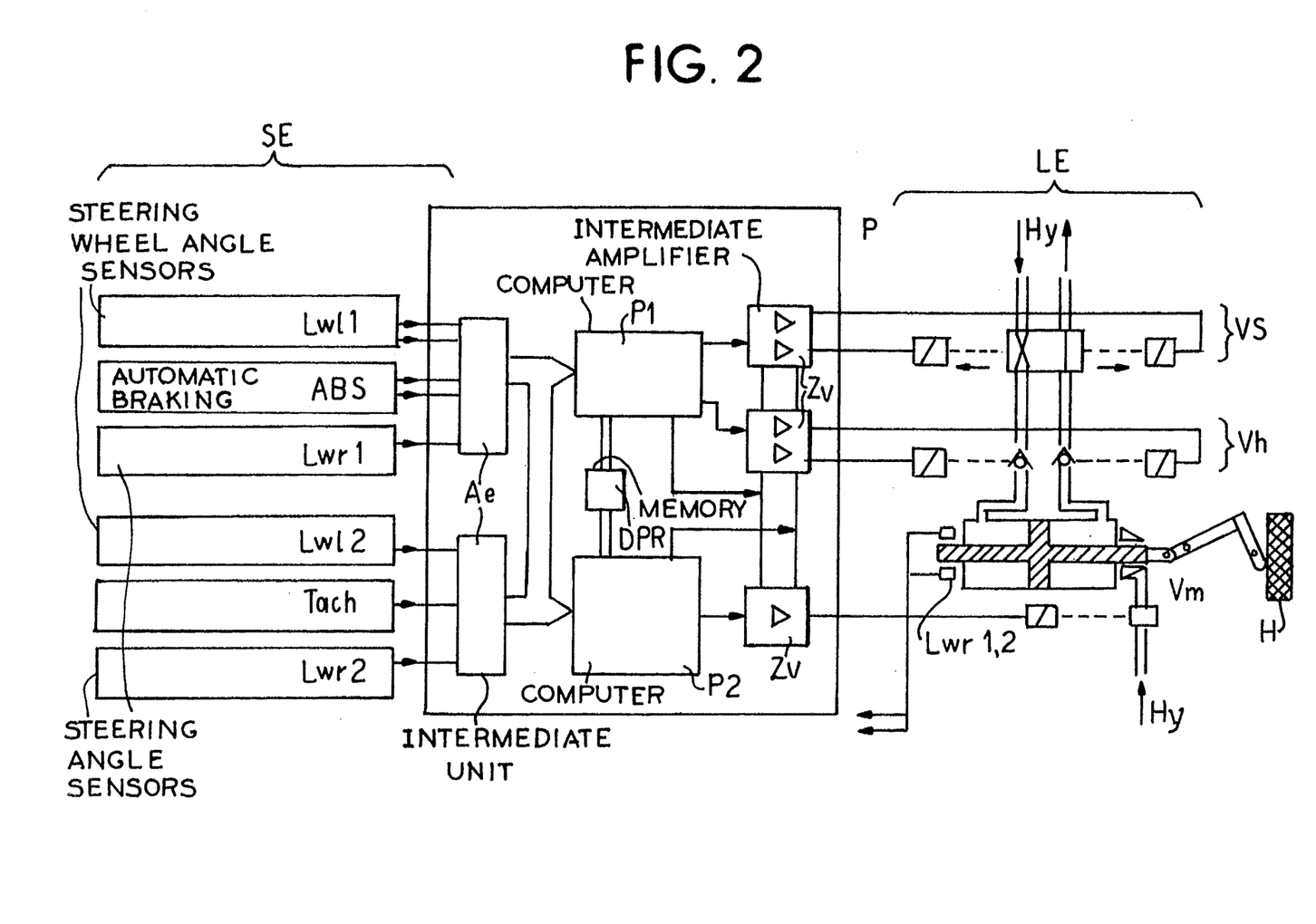
FIG. 2 is a block diagram of another embodiment of the present invention.

The exemplary embodiment shown in FIG. 2 is constructed and operated in a way very similar to that shown in FIG. 1. Instead of a pre-amplifier unit VV, sensor units are attached here that—at least in part—already respectively contain electronic components in and of themselves, so that the pre-amplifier unit VE, so to speak, is divided into individual parts and is contained in the sensor units. These sensor units, for example, represent redundant steering wheel angle sensor units Lw1 ½, whereby the one sensor Lw11 may be attached, for example, to the steering angle at the steering column and the other steering wheel angle sensor Lw12 may be attached, for example, to the steering gear and/or to parts of the steering of the front wheels. Redundant back wheel steering angle sensor units Lwr1/2 are attached in a similar way, these, for example, measuring the back wheel steering angle at the back wheels and/or indirectly at appertaining steering linkages and/or steering gear parts separately from one another. Sensor units Tach and ABS for the acquisition of the vehicle speed and of the braking system are also attached.

The example shown in FIG. 2 again contains two computers P1, P2, whereby the signals of the sensors, i.e. the control signals conducted to the computers, are evaluated in the two computers P1, P2 as in the example shown in FIG. 1.

The example shown in FIG. 2 contains power amplifiers as intermediate amplifiers Zv which in turn then control the steering means LE, whereby the steering means LE here works according to a hydraulic method by way of example. The hydraulic fluid Hy acts via mechanical safety valves Vm, via hydraulic safety valves Vh and servo valves Vs on hydraulically controlled influencing units of the steering angle of the back wheels whereof one, refenenced H, is symbolically indicated with parts of its steering linkage. Sensors Lwr1/2 are shown by way of example which indirectly acquire the steering angle of the back wheels H. Here, too, the error tolerance of the control unit is enhanced in that the calculating unit is inventively prevented from erroneously not outputting an emergency steering signal even though an emergency is present, whereby each of the two computers immediately outputs its emergency steering signal to the steering means in an emergency on its own, independently of the other computer.

For a self-test of the control unit, test signals and/or status signals St—see FIG. 1, not shown in FIG. 2—can be supplied to the computers P1, P2 from component parts of the control unit, as in the examples shown in FIG. 1, whereby the appertaining computer P1 and/or P2 always output B an emergency steering signal to the emergency steering elements that are redundant here—or not redundant—for the sake of safety as soon as—in the self-testing, it has identified malfunctions of component parts, for example of one of the redundant sensors or of an emergency element Noh/Nom or of one of the computers P1, P2 themselves—this in order to enhance the safety of the road vehicle. The dangerous situation that the reliability of the control unit is considerably reduced given critical defects or malfunctions of the appertaining component parts is also avoided in this way in the embodiment shown in FIG. 2. Here, too, the driver of the road vehicle—as in the embodiment shown in FIG. 1—can be urged, particularly with signaling lamps L, to seek a repair shop as soon as possible in order to have the defect of the appertaining component parts eliminated.

In the examples shown in FIG. 1, the steering means LE redundantly contains at least two emergency elements Noh/Nom each of which independently controls the steering angle in an emergency in emergency-suited fashion according to the selected emergency operation concept. What is thereby enabled is that, despite a malfunction of one of these two emergency elements, the emergency steering signal output by the computer reliably triggers an emergency-suited control of the steering of the back wheels because the other emergency element that is still faultlessly functioning itself triggers the emergency-suited control in this case.

In the embodiment shown in FIG. 1, each computer respectively outputs its emergency steering signal—in the normal case at any rate—to both emergency elements Noh/Nom, namely respectively via separate emergency steering signal lines individually allocated to the individual computers P1/P2. A rupture or some other malfunction on such an emergency steering signal line as well as the complete outage of one of the computers then still does not impede the emergency-suited control of the steering of the back wheels.

When starting the road vehicle, both emergency elements can be initially operated as in an emergency. The safety of the road vehicle is then also enhanced during starting wherein some of the sensor signals, see, for example Ss, still do not represent usable values and a reliable evaluation with the two computers is often still impossible.

Particularly in the embodiment shown in FIG. 1, the two computers P1, P2 respectively directly or indirectly exchange corresponding, documentary information—for subsequent emergency diagnosis and/or for mutual testing during ongoing operation and/or when starting the motor vehicle. This can be implemented in various ways:

The afore-mentioned monitoring unit Sv, see FIG. 1, can in turn compare a subsequent: comparison between the two computers—particularly between their relevant intermediate results and final results of the evaluations——and can interrupt the computers as needed with the interrupt signal IntR, for example to have special self-test programs executed in the two computers and in order to have the computers subsequently re-start with a start signal Reset. This monitoring unit Sv can again re-start the appertaining computer or computers, for example with a watch dog and with the reset signal, particularly in case one computer or both computers have become totally "stuck" i.e. the iterative methods did not lead to an adequately precise result after a reasonable time span.

In principle, however, it is not necessary to introduce a separate monitoring unit Sv of this type. Instead, such monitorings can also be achieved within the computers P1, P2 themselves from time to time, for example with the assistance of a watchdog and direct lines DL, particularly when the computers have memory areas in them into which the other computer can actively write and from which the other computer can actively read without interrupting the operation of the computer that is thereby passive.

To that end, the information can be intermediately stored such, for example in the dual port RAM DPR as well, that each computer P1, P2 has a memory area therein in which it itself can write and read and the other computer, however, can only read. This is indicated by the special nature of the arrows between the computers P1, P2 and the appertaining memory DPR. This memory DPR, however, can additionally comprise a special memory area which can be arbitrarily read and written by both computers P1, P2.

With such a memory DPR, moreover, a documentation can also be produced which documents additional control instructions that lead to the intermediate results or the final result of the evaluation; by comparison of such documents, the computers can also mutually restart as needed in case the stored information are too divergent and particularly in case the computers became completely stuck. The memory DPR has the advantage that the computers can even work asynchronously but clock-shifted without the computers mutually delaying one another by the comparison and impeding the fast, immediate generation of the emergency steering signal.

Particularly after the output of an emergency steering signal and/or after the recognition of a status signal St of an arbitrary component part, see Noh, Sa, L, Sv, Nom that corresponds to an error, the computers can thus be initialized for error diagnosis, to which end both computers can be arrested. As soon as the diagnosis has been made and has been stored, for example via the unit Diag, the two computers are ultimately re-started.

When operation is initially carried out as in an emergency when steering is started, the steering means LE should only switch into the normal operation when the control signals and/or the said information showed that no emergency is present.

In the starting phase of the road vehicle, a different emergency element of the two emergency elements is preferably individually assigned to each computer until the check of the emergency elements ultimately indicates their freedom from error. After the switch into the normal operation, however, each computer directly outputs its emergency steering signal to both emergency elements in case of emergency. It can thus be assured in a relatively surveyable way that the computers checked more or less all critical elements of the control unit before a switch to normal operation, i.e. to normal steering of the back wheels is undertaken.

Emergency elements that themselves do not switch into the normal operating condition until after activation with a special activation process are especially reliable. Such emergency elements are thus operated as an emergency in the quiescent condition and immediately after the starting of the road vehicle, independently of the two computers.

The computers can fundamentally operate synchronously. An operation wherein the two computers in fact work synchronously but chronologically shifted by approximately half an evaluation period is, however, preferred. When the evaluation period of a computer thus lasts, for example, 20 msec on average, then the optimum chronological shift amounts to approximately 10 msec. What can be achieved in this way is that the one computer already outputs its emergency steering signal while the other has not yet even concluded its evaluation. In the normal case, thus, such a control unit reacts especially quickly in an emergency, as long as, namely, both computers are faultlessly working.

The reliability of the control unit, however, can also be additionally increased in another way. Thus, the computers can be differently equipped in software terms and/or hardware terms and can then even be asynchronously operated. Accordingly, many consequences of software errors and hardware faults then become innocuous, particularly when the one computer or both computers get stuck because of different programs; in contrast whereto the other computer, on the basis of its program, still arrives relative quickly at a calculating result it itself has accepted. As a result of such an asynchronous operation of both computers that, for example, is particularly enabled by software and/or hardware differences, both computers can work very flexibly corresponding to their respective time requirement for evaluating the control signals, this being capable of greatly enhancing the reaction speed of the control unit precisely in critical situations.

The sensors can also be multiply provided in redundant fashion, i.e. can thus measure the same physical quantity in a fashion that is redundant but basically very different. For example, deflections of the steering angles can be measured once in the immediate proximity of the appertaining wheels and can then be additionally redundantly measured close to the steering gear parts. Above all else, it is also possible to only consider that sensor of the redundant sensors that supplies the greatest indication of an emergency for the evaluation.

It is not necessary that the sensor signals or control signals—for example digital control signals—acquired therefrom always be directly supplied to the computers. Editing units—see Ae1, Ae2, Ae3 in FIG. 1 and Ae in FIG. 2—can also be inserted into the leads therebetween, these preprocessing the control signals, for example converting them into parameters derivable from the sensor signals and/or producing a common control signal from a variety of sensor signals. Such editing units make it possible that the computers P1, P2 themselves can work in an especially fast evaluation period clock, this further enhancing the reliability of the control unit.

On principle, such editing units can separately forward their results to the computers, see AE1, AE2 in FIG. 1, or can also forward them in common to both computers, see Ae3 in FIG. 1 and Ae in FIG. 2. When they forward their results to respectively both computers, the relieving of the two computers is achieved with especially little hardware outlay—whereby, when this editing unit is then additionally redundant, see FIG. 2, a mutual monitoring or, respectively, a worst-case selection by the computers is then possible, and the computers still output their emergency steering signal very reliably and quickly as needed even given faulty operation of one of the two editing units.

The cause of malfunctions of the control unit, for example the deviations between the two editing units as well as needed, can be more closely identified later via a subsequent diagnosis with a diagnosis unit Diag during maintenance of the road vehicle.

On principle, sensors that are redundantly provided, can be connected divided to the editing units such that the one sensor is connected to the one editing unit and the other sensor is connected to the other editing unit, see, for example, FIG. 2. For example, this allows a subsequent identification of the causes of different sensor signals from redundant sensors that intrinsically belong together, for example with the unit Diag or, for example, by the computers themselves or by the monitoring unit Sv—see FIG. 1.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

Figure 3:
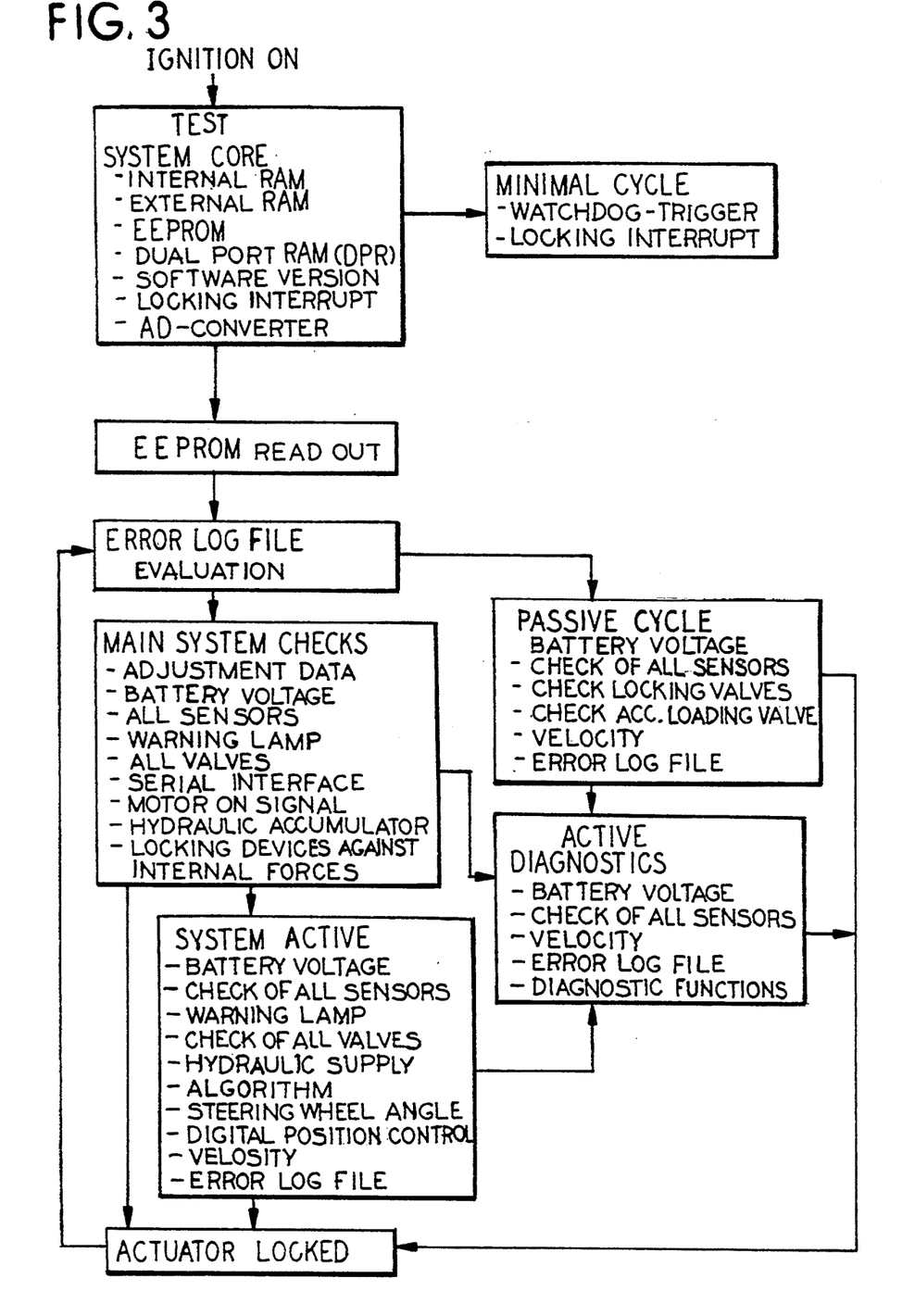
FIG. 3 is a system rate transition diagram of a four wheel steering system according to the present invention.

FIG. 3 depicts the state transition diagram of a four wheel steering system. After ignition on or after each system reset the system changes from the state IGNITION ON to the state TEST SYSTEM CORE. In this state the internal and external RAM, the EEPROM, the Dual Port Ram, the software version, the locking interrupt lines and the Analog/Digital converter are checked by the processors. In case of an error the system branches to the MINIMAL CYCLE state.

The MINIMAL CYCLE consists of only some machine codes (programmed in Assembler) for which a minimum of operating hardware is necessary (e.g. permanent deactivation of all valves). While executing these machine codes of the MINIMAL CYCLE the watchdog controls the processor. The MINIMAL CYCLE state equals a continuous software reset. The rear-axle is locked and may not be activated by chance by any processor. After each IGNITION-ON the processor systems are checked again. If a fault is present the software branches again to the MINIMAL CYCLE. Otherwise it engages the TEST SYSTEM CORE. The state MINIMAL CYCLE is necessary because a fault in one processor system results in other processor system no longer being checked. If the ECU would continue with a one processor system normally an uncontrolled movement of the rear-axle could not be completely ruled out.

In the state, EEPROM read out, the processor reads the error log file in the EEPROM.

In the state ERROR LOG FILE EVALUATION the error log file is evaluated. If the flag for a definite ARK deactivation or a temporary ARK deactivation is set, the software branches into the PASSIVE CYCLE state. If none of these locks are set the software branches into the MAIN SYSTEM CHECK.

In the MAIN SYSTEM CHECKS the locking devices within the actuator and the proportional valve are checked. In order to have the right conditions present to do these hydraulic checks the software waits until a prescribed supply pressure is reached, the battery supply voltage reaches a threshold and the vehicle velocity is below a threshold. If during these checks an error is detected this error is written to the EEPROM and the LOCKING INTERRUPT is initiated.

If a definite ARK deactivation or temporary ARK deactivation is flagged the software branches from the state EVALUATE ERROR LOGFILE into the PASSIVE CYCLE state. During PASSIVE CYCLE the locks are not open. The rear-axle is not steered. Both processors check each other and check the incoming sensor, signals. If an error is detected the error is written to the EEPROM. The PASSIVE CYCLE may be left only by a watchdog intervention, a low voltage reset or a request for ACTIVE DIAGNOSTICS. The system is fully operable if it is in PASSIVE CYCLE.

If there is no fault during the MAIN SYSTEM CHECKS the system branches into the SYSTEM ACTIVE state. In this state the rear-axle is steered according to the steering algorithm. All input signals are measured, computed and errors are checked. The processors check each other. If a fault is detected the software either engages the SOFT TRANSIENT MODE or locks immediately the rear-axle. For an error with low severity the disturbed signal is substituted by a constant auxiliary value for the time up to IGNITION-OFF.

The LOCKING INTERRUPT transfers the system into a well defined state immediately. The processor which detects the fault branches into the state and also leads the other processor into the state via a hardware interrupt. This procedure makes sure that a lock is possible even if the interrupt line is disturbed. In the state LOCKING INTERRUPT all power stages are switched off (rear-axle locking active), the temporary ARK deactivation is set and both processors are synchronized. If a synchronization is not possible the fault is assumed to be fatal, i.e. the system must branch into the MINIMAL CYCLE via a watchdog reset. If a synchronization was successful a decision is made whether the locking fault must be introduced to the error log file or not. Depending on this decision an ECU internal order to write the EEPROM is stated. After execution of the LOCKING INTERRUPT the software continues at the location EVALUATE ERROR LOGFILE.

For safety reasons a branch into the ACTIVE DIAGNOSTICS is only possible if first a request from the diagnostic tester is present and second within one velocity measurement interval there is neither an impulse from the ABS-sensors nor from the speedometer (vehicle at stand-still). The latter-mentioned velocity condition is applicable even if the system currently is using the auxiliary velocity value. The ACTIVE DIAGNOSTICS state contains all diagnostic functions to manually move the rear-axle and to calibrate the zero-position values. An additional function of ACTIVE DIAGNOSTICS is the erasure of the error log file. System measured signals and contents of the error log file may be read via a diagnostic tester even during the normal operation of the ECU. The state ACTIVE DIAGNOSTICS is left if a pulse from the speed sensors is detected. This simplification is permissible because during ACTIVE DIAGNOSTICS the vehicle is at a standstill. Therefore a wrong movement of the rear actuator contains no safety risk.

Writing one block of Information into the EEPROM may not be done during only one system cycle. Therefore the data which have to be written into the EEPROM are transferred into an internal buffer before and slices of this buffer are transferred into the EEPROM at every system cycle.

What is claimed is:

1. An electronic control unit for steering the back wheels of a road vehicle, having a steering means controlled by an emergency steering signal, said steering means in an emergency controlling the steering angle of the back wheels in accord with a selected emergency operation concept; sensors that at least respectively acquire steering angle, traveling speed and degree of steering wheel lock and that provide respective sensor signals; and a calculating unit that contains at least one computer means to which said sensor signals are supplied as control signals and that outputs, as a function of an evaluation of said sensor signals, said emergency steering signal to said steering means, comprising:
    said computer means having at least two computers that differ from one another in terms of at least one of hardware and software;
    said control signals being supplied to each of said two computers;
    each computer of said two computers independently evaluating said control signals; and
    each computer of said two computers immediately outputting an emergency steering signal to said steering means in an emergency independently of the other computer.

2. The electronic control unit according to claim 1, wherein
    for self-testing said control unit, said computers are also supplied with test signals and/or status signals from component parts of said control unit; and wherein
    the appertaining computer outputs an emergency steering signal when, in self-test, it recognized malfunctions of its own component parts.

3. The electronic control unit according to claim 1, wherein said steering means has at least two redundant emergency elements each of which is autonomously capable of controlling said steering angle in an emergency corresponding to said emergency operation concept.

4. The electronic control unit according to-patent claim 3, wherein each computer in a normal case respectively outputs its emergency steering signal to both emergency elements via emergency steering signal lines individually allocated to said computers.

5. The electronic control unit according to claim 3, wherein in the starting phase of the road vehicle, each computer interfaces with a different emergency element of said two emergency elements individually allocated to it until a check of said emergency elements has shown they are free of faults.

6. The electronic control unit according to claim 3, wherein both emergency elements, following the start of the road vehicle, proceed into the normal operating condition only after activation on the basis of a special activation process.

7. The electronic control unit according to claim 1, wherein after the output of an emergency steering signal and/or after the output of a status signal of a component part of said control unit corresponding to an error, both computers are stopped, are operated for error diagnosis and substantially restarted.

8. The electronic control unit according to claim 1, wherein, when the motor vehicle starts, said steering means is initially operated as in an emergency.

9. The electronic control unit according to claim 1, wherein said two computers exchange information for at least one of subsequent emergency diagnosis, reciprocal testing while starting and reciprocal testing during ongoing operation of the road vehicle.

10. The electronic control unit according to claim 1, wherein at least one of the two computers generates steering signals during normal operation and outputs said steering signals during normal operation to said steering means for normal steering angle control.

11. The electronic control unit according to claim 1, wherein in an emergency said steering means sets said steering angle to zero after a delay time period.

12. The electronic control unit according to claim 1, wherein in an emergency said steering means maintains a most recently established steering angle.

13. An electronic control unit for steering the back wheels of a road vehicle, having a steering means controlled by an emergency steering signal, said steering means in an emergency controlling the steering angle of the back wheels, having sensors that at least respectively acquire steering angle, traveling speed and degree of steering wheel lock and that provide respective sensor signals, and having a calculating unit that contains at least one computer means to which said sensor signals are supplied as control signals and that outputs said emergency steering signal to said steering means in response to said sensor signals, comprising:
said computer means having at least two computers that differ from one another in terms of at least one of hardware and software;
said control signals being supplied to each of said two computers;
each computer of said two computers independently evaluating said control signals; and
each computer of said two computers immediately outputting an emergency steering signal to said steering means in an emergency, independently of the other computer, and said steering means thereby maintaining a most recently established steering angle.

14. The electronic control unit according to claim 13, wherein for self-testing said control unit, said computers are also supplied with test signals and/or status signals from component parts of said control unit; and wherein the appertaining computer outputs an emergency steering signal when, in self-test, it recognized malfunctions of its own component parts.

15. The electronic control unit according to claim 13, wherein said steering means has at least two redundant emergency elements in each of which is autonomously capable of controlling said steering angle in an emergency.

16. The electronic control unit according to claim 15, wherein each computer respectively outputs its emergency steering signal to both emergency elements via emergency steering signal lines individually allocated to said computers.

17. The electronic control unit according to claim 15, wherein in the starting phase of the road vehicle, each computer interfaces with a different emergency element of said two emergency elements individually allocated to it until a check of said emergency elements has shown they are free of faults.

18. The electronic control unit according to claim 13, wherein said two computers exchange information for at least one of subsequent emergency diagnosis, reciprocal testing while starting and reciprocal testing during ongoing operation of the road vehicle.

19. The electronic control unit according to claim 13, wherein after the output of an emergency steering signal and/or after the output of a status signal of a component part of said control unit corresponding to an error, both computers are stopped, are operated for error diagnosis and substantially re-started.

20. The electronic control unit according to claim 13, wherein, when the motor vehicle starts, said steering means is initially operated as in an emergency.

* * * * *